US007664915B2

(12) United States Patent
Gopal et al.

(10) Patent No.: US 7,664,915 B2

(45) Date of Patent: Feb. 16, 2010

(54) HIGH PERFORMANCE RAID-6 SYSTEM ARCHITECTURE WITH PATTERN MATCHING

(75) Inventors: Vinodh Gopal, Westboro, MA (US); Gilbert Wolrich, Framingham, MA (US); Kirk S. Yap, Framingham, MA (US); Wajdi K. Feghali, Boston, MA (US); John Vranich, Wext Roxbury, MA (US); Robert P. Ottavi, Brookline, NH (US)

(73) Assignee: Intel Corporation, Santa Clara, CA (US)

( * ) Notice: Subject to any disclaimer, the term of this patent is extended or adjusted under 35 U.S.C. 154(b) by 427 days.

(21) Appl. No.: 11/642,315

(22) Filed: Dec. 19, 2006

(65) Prior Publication Data

US 2008/0148025 A1 Jun. 19, 2008

(51) Int. Cl.
*G06F 12/00* (2006.01)

(52) U.S. Cl. ........................................ 711/114; 714/770

(58) Field of Classification Search ................. 711/114; 714/770

See application file for complete search history.

(56) References Cited

U.S. PATENT DOCUMENTS 6,247,157 B1 6/2001 Edirisooriya
6,594,796 B1 * 7/2003 Chiang ........................ 714/800
7,343,546 B2 * 3/2008 Edirisooriya et al. ........ 714/770
7,433,999 B2 * 10/2008 Mochizuki et al. .......... 711/114
2002/0157044 A1 10/2002 Byrd
2003/0066010 A1 4/2003 Acton
2003/0070042 A1 4/2003 Byrd et al.
2005/0050384 A1 * 3/2005 Horn ............................. 714/6
2006/0123271 A1 * 6/2006 Forhan et al. .................. 714/7
2006/0156211 A1 7/2006 Edirisooriya et al.
2007/0028145 A1 * 2/2007 Gerhard et al. ................ 714/36
2008/0059865 A1 3/2008 Gopal et al.

FOREIGN PATENT DOCUMENTS

JP 2000-259359 A2 9/2000

OTHER PUBLICATIONS

Plank, "A tutorial on Reed- Solomon coding for fault- tolerance in RAID-like systems Software—Practice & Experience", vol. 27, Issue 9, Sep. 1997, 19 pgs.

International Search Report and Written Opinion for PCT/US2007/086672 mailed May 13, 2008, 10 pages.

International Preliminary Report on Patentability for Patent Application No. PCT/US2007086672, mailed Jul. 2, 2009, 6 pages.

* cited by examiner

*Primary Examiner*—Christian P Chace
*Assistant Examiner*—Hashem Farrokh

(57) ABSTRACT

An acceleration unit offloads computationally intensive tasks from a processor. The acceleration unit includes two data processing paths each having an Arithmetic Logical Unit and sharing a single multiplier unit. Each data processing path may perform configurable operations in parallel on a same data. Special multiplexer paths and instructions are provided to allow P and Q type syndromes to be computed on a stripe in a single-pass of the data through the acceleration unit.

24 Claims, 11 Drawing Sheets

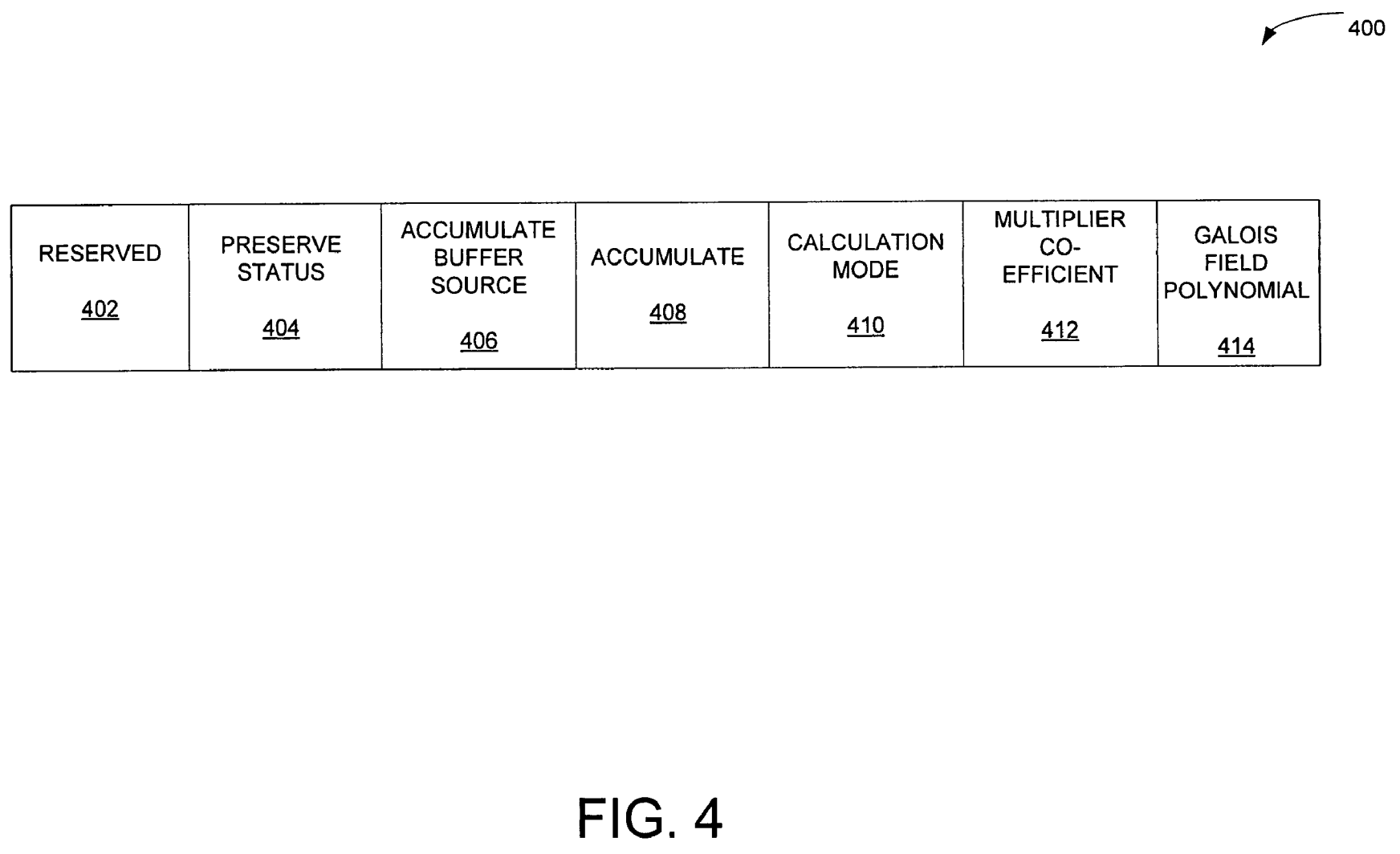

400

| RESERVED 402 | PRESERVE STATUS 404 | ACCUMULATE BUFFER SOURCE 406 | ACCUMULATE 408 | CALCULATION MODE 410 | MULTIPLIER CO-EFFICIENT 412 | GALOIS FIELD POLYNOMIAL 414 |
|---|---|---|---|---|---|---|

FIG. 4

HIGH PERFORMANCE RAID-6 SYSTEM ARCHITECTURE WITH PATTERN MATCHING

FIELD

This disclosure relates to redundant array of independent disks (RAID) systems and in particular to acceleration of computations for a RAID-6 system.

BACKGROUND

A Redundant Array of Independent Disks (RAID) combines a plurality of physical hard disk drives into a logical drive for purposes of reliability, capacity, or performance. Thus, instead of multiple physical hard disk drives, an operating system sees the single logical drive. As is well known to those skilled in the art, there are many standard methods referred to as RAID levels for distributing data across the physical hard disk drives in a RAID system.

For example, in a level 0 RAID system the data is striped across a physical array of hard disk drives by breaking the data into blocks and writing each block to a separate hard disk drive. Input/Output (I/O) performance is improved by spreading the load across many hard disk drives. Although a level 0 RAID improves I/O performance, it does not provide redundancy because if one hard disk drive fails, all of the data is lost A level 5 RAID system provides a high level of redundancy by striping both data and parity information across at least three hard disk drives. Data striping is combined with distributed parity to provide a recovery path in case of failure. A level 6 RAID system provides an even higher level of redundancy than a level 5 RAID system by allowing recovery from double disk failures. In a level 6 RAID system, two syndromes referred to as the P syndrome and the Q syndrome are generated for the data and stored on hard disk drives in the RAID system. The P syndrome is generated by simply computing parity information for the data in a stripe (data blocks (strips), P syndrome block and Q syndrome block). The generation of the Q syndrome requires Galois Field multiplications and is complex in the event of a disk drive failure. The regeneration scheme to recover data and/or P and/or Q syndromes performed during disk recovery operations requires both Galois multiplication and inverse operations.

The regeneration is typically performed using lookup tables for computation or through the use of a plurality of Galois-field multipliers which are limited to a specific polynomial.

BRIEF DESCRIPTION OF THE DRAWINGS

Features of embodiments of the claimed subject matter will become apparent as the following detailed description proceeds, and upon reference to the drawings, in which like numerals depict like parts, and in which:

FIG. 4 is a block diagram of an embodiment of a configuration register for any one of the data processing paths in the data processing unit shown in FIG. 3;

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

Figure 1:
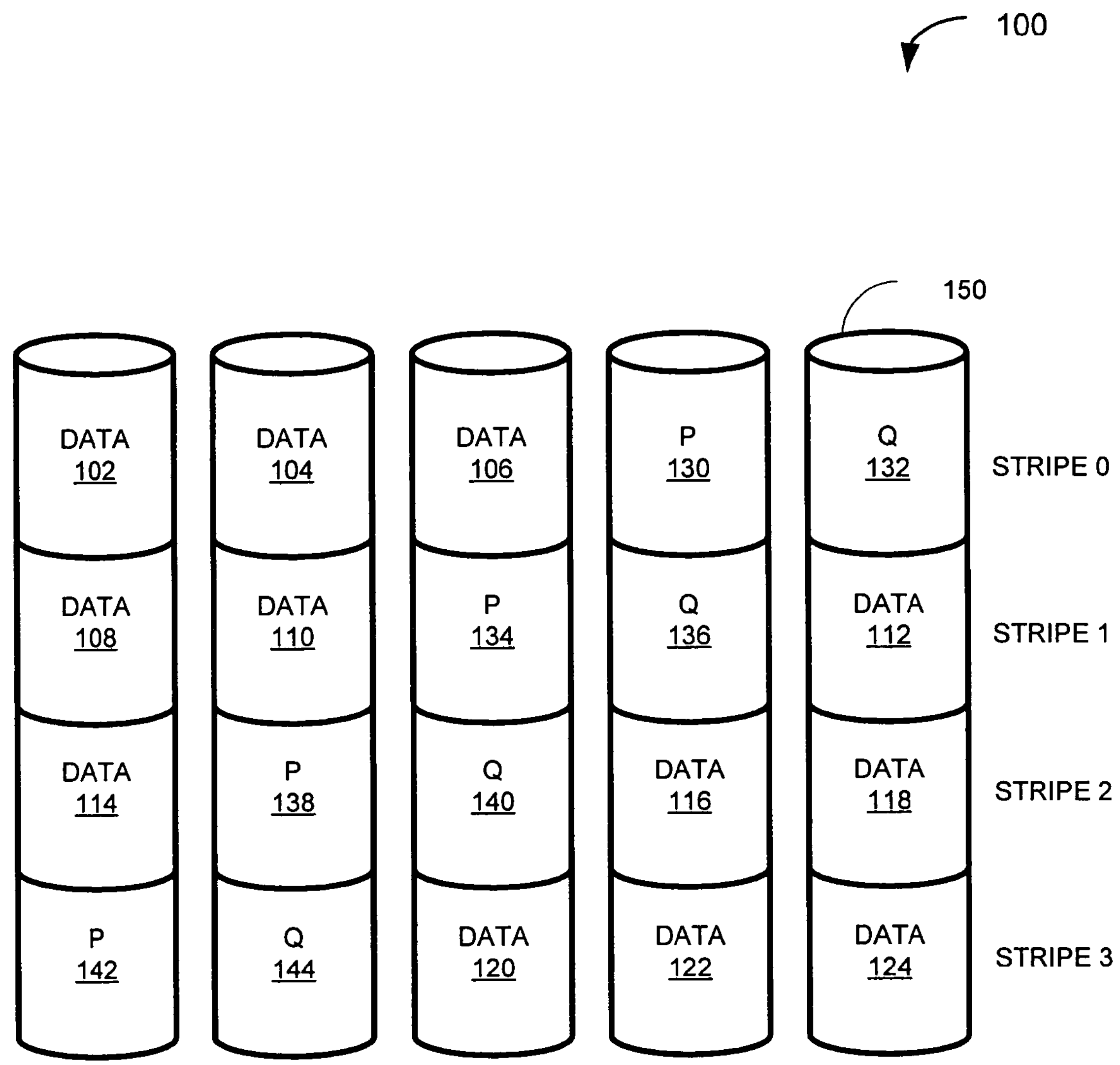
FIG. 1 is a block diagram illustrating an embodiment of a RAID-6 array showing a plurality of stripes with each stripe including data blocks (strips) and P and Q syndromes striped across an array of hard disks.

FIG. 1 is a block diagram illustrating an embodiment of a RAID-6 array 100 showing a plurality of stripes with each stripe including data blocks (strips) and P and Q syndromes striped across an array of hard disks 150. In the embodiment shown, the RAID array has five hard disks 150: three data disks and 2 syndrome (P, Q) disks. Data is written to the RAID-6 array using block-level striping with P and Q syndromes distributed across the member hard disks in a round robin fashion. Sequential data, for example, a file segmented into blocks may be distributed across a stripe, for example, horizontal stripe 0, with one of the blocks stored in data blocks 102, 104, 106 on three of the data disks 102. A P and a Q syndrome computed for the data blocks 102, 104, 106 in horizontal stripe 0 are stored in a respective P block 130 and Q block 132. P and Q syndrome blocks are stored on different hard disks 150 in each stripe. In one embodiment, there are 512 bytes in each block in a stripe.

The P syndrome may be generated by performing an exclusive OR (XOR) operation. XOR is a logical operation on two operands that results in a logical value of '1', if only one of the operands has a logical value of '1'. For example, the XOR of a first operand having a value '11001010' and a second operand having a value '10000011' provides a result having a value '01001001'. If the hard drive that stores the first operand fails, the first operand may be recovered by performing an XOR operation on the second operand and the result.

The P syndrome is the simple parity of data (D) computed across a stripe using ⊕(XOR) operations. In a system with n data disks, the generation of the P syndrome is represented by equation 1 below:

$$P=D_0 \oplus D_1 \oplus D_2 \ldots \oplus D_{n-1} \quad \text{(Equation 1)}$$

The computation of the Q syndrome requires multiplication (*) using a Galois Field polynomial (g). Arithmetic operations are performed on 8-bit (byte) Galois-field polynomials at very high performance. A polynomial is an expression in which a finite number of constants and variables are combined using only addition, subtraction, multiplication and non-negative whole number exponents. One primitive polynomial is $x^8+x^4+x^3+x^2+1$ which may be denoted in hexadecimal notation by 1D. The Galois Field (GF) operations on polynomials are also referred to as GF(2^8) arithmetic. In a system with n data disks, the generation of the Q syndrome is represented by equation 2 below:

$$Q=g^0*D_0\oplus g^1*D_1\oplus g^2*D_2 \ldots \oplus g^{n-1}*D_{n-1} \quad \text{(Equation 2)}$$

Byte-wise Galois-field operations are performed on a stripe basis, where each byte in the block is computationally independent from the other bytes. Byte-wise Galois-Field operations can accommodate as many as 255 (2^8−1) data disks.

Figure 2:
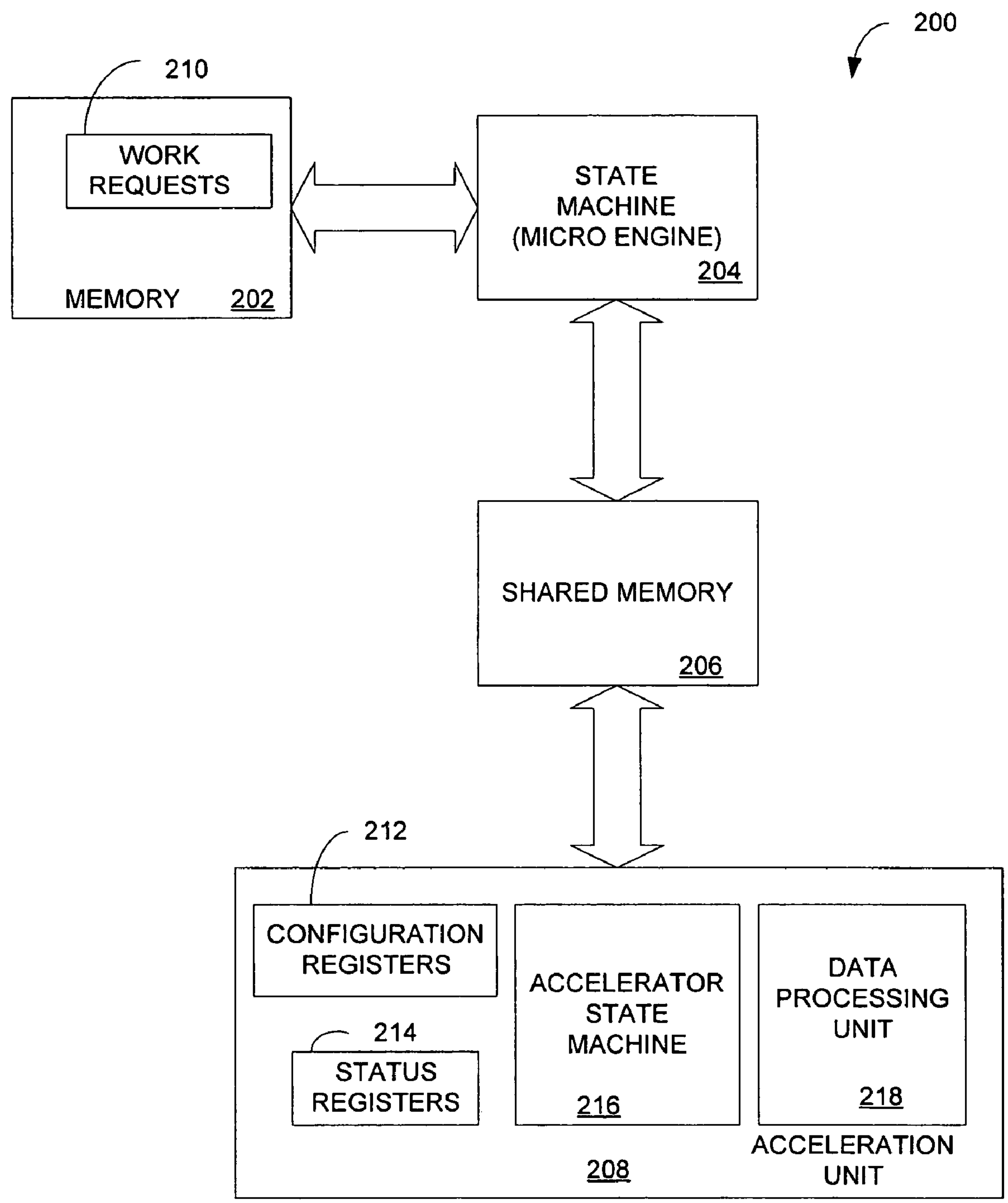
FIG. 2 is a block diagram of a system that includes an embodiment of a system that includes an acceleration unit to accelerate computations according to the principles of the present invention.

FIG. 2 is a block diagram of a system that includes an embodiment of an acceleration unit 200 to accelerate computations according to the principles of the present invention.

The system includes a memory 202 for storing work requests 210 and a state machine (micro engine) 204 which processes the work requests 210. The state machine 204 issues instructions to an acceleration unit 208 through a shared memory 206. Based on instructions executed from the state machine 204, the acceleration unit 208 may perform arithmetic operations on 8-bit Galois-Field polynomials.

In one embodiment the state machine 204 may be one of a plurality of micro engines in a processor, for example, an IXP® 2400 processor available from Intel Corporation. The acceleration unit 208 offloads the computation of 8-bit Galois-Field polynomials from the state machine (micro engine) 204.

The memory 202 and the shared memory 206 may be Dynamic Random Access Memory (DRAM), Static Random Access Memory (SRAM), Synchronized Dynamic Random Access Memory (SDRAM), Double Data Rate 2 (DDR2) RAM or Rambus Dynamic Random Access Memory (RDRAM) or any other type of memory.

The acceleration unit 208 includes a data processing unit 218 to perform operations on the data. Based on a work request 210 stored in memory, the state machine 204 may offload computation for a RAID array operation to the acceleration unit 208. In one embodiment, the RAID array may be the RAID-6 array 100 shown. The acceleration unit 208 also includes control registers 212, status registers 214 and an acceleration unit state machine 216.

Figure 3:
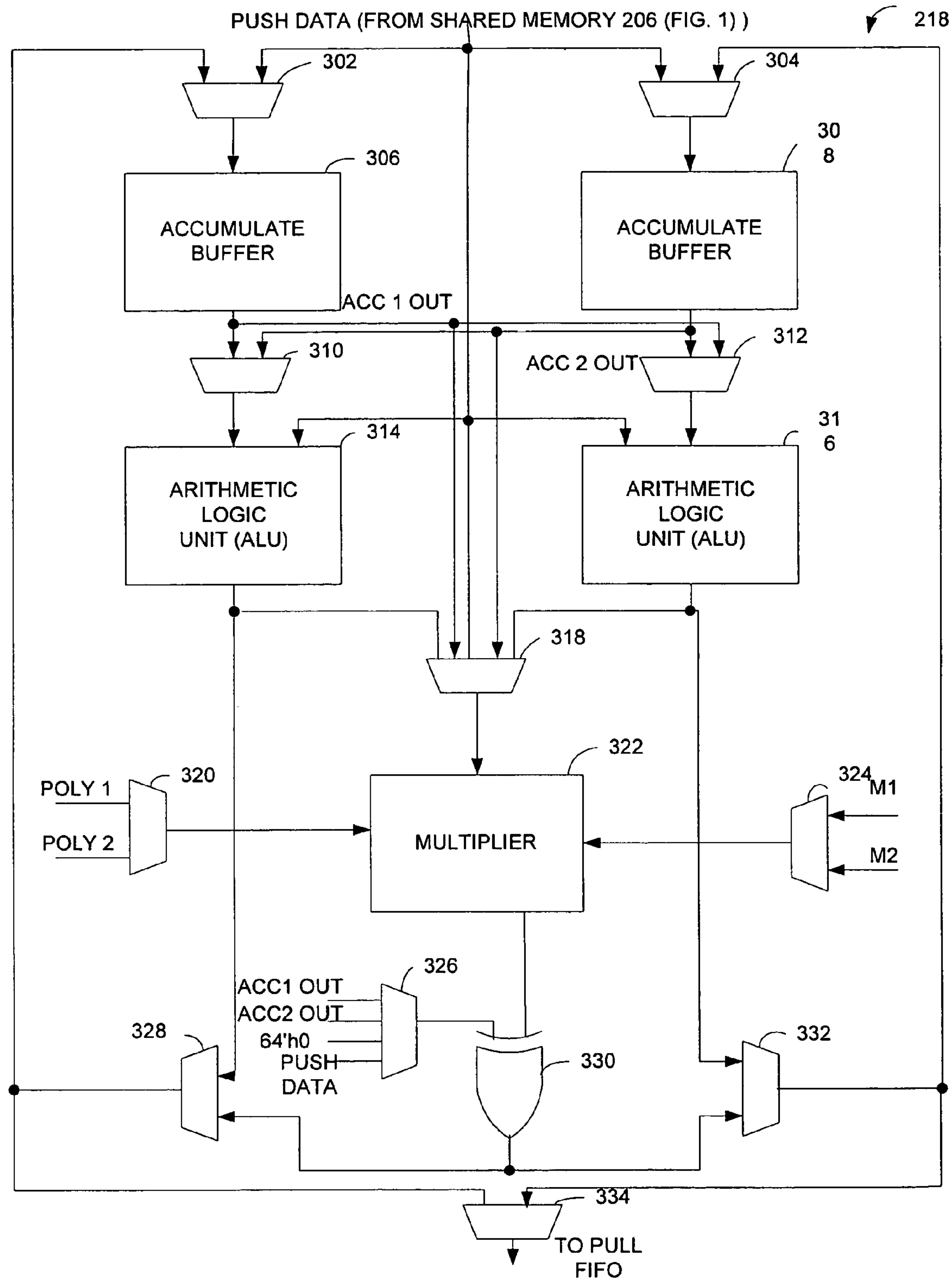
FIG. 3 is a block diagram of an embodiment of the data processing unit in the acceleration unit shown in FIG. 2.

FIG. 3 is a block diagram of an embodiment of the data processing unit 218 in the acceleration unit 208 shown in FIG. 2. In the embodiment shown, the data processing unit 218 includes two Arithmetic Logical Units (ALUs) 314, 316. The ALUs perform arithmetic and logical operations on operands. The logical or arithmetic operation that is performed by each independent ALU 314, 316 is configurable through the configuration registers 212 (FIG. 2) associated with the ALUs 314, 316.

In an embodiment, each ALU 314, 316 may perform byte-wise arithmetic and logical operations. Each ALU 314, 316 may include an XOR array and compare and zero-check functions and may perform a P or Q syndrome calculation independently in a single-pass of data through the data processing unit 218.

In an embodiment, each ALU 314, 316 has a 64-bit (8-byte) data path and includes 8 configurable Galois Field (GF)-Byte slices. Each GF-Byte slice operates on one byte in the 8-byte data path. Each of the ALUs 314, 316 operates on 8 bytes concurrently in the 64-bit data path. This allows disk block operations to be performed in parallel using the appropriate bytes from each disk block. Each ALU 314, 316 has an respective independent accumulate buffer 306, 308 that may store up to 512 Bytes. The ALUs 314, 316 share a GF(8) byte-wise multiplier 322. The accumulate buffers 314, 316 may be used to store intermediate results of operations in the ALUs 314, 316 and multiplier 322 in the processing unit 218.

The data processing unit 218 has two separate data processing paths. One data processing path includes accumulate buffer 306 and ALU 314. The other data processing path includes accumulate buffer 308 and ALU 316.

Both data processing paths share multiplier 322. If both data processing paths need to perform general multiply-accumulate functions at the same time, the use of multiplier 322 is toggled between the ALUs 314, 316. Although throughput is reduced, the acceleration unit 208 may allow double-disk recovery to be performed with a single general multiply-accumulate with a single pass of the data from shared memory 206.

The acceleration unit 208 uses the single multiplier 322 efficiently with little loss of performance in storage applications, for example, computing P and Q syndromes and performing data recovery. However, the acceleration unit 208 is not limited for use in storage applications. The acceleration unit 208 may be used for computations involving any 8-bit polynomial that generates an 8-bit field. Furthermore, each ALU 314, 316 may work independently on its own polynomial.

The data processing unit 218 includes a plurality of multiplexers. Each multiplexer encodes (or multiplexes) information for two or more inputs into a single output based on the state of a selector. For example, multiplexers 302, 304, allow selection of the source of data to be stored in each accumulate buffer 306, 308. The data source may be push data received from shared memory 206 (FIG. 2) or intermediate results output from the ALUs 314, 316 or multiplier 322. Multiplexers 310, 312 allow selection of the source for one of the operands to the respective ALU 314, 316. The operand source may be either from accumulate buffer 306 or accumulate buffer 308.

Multiplexer 318 allows selection of one of the operands for multiplier 322. The operand source is either the result of an operation in ALU 314 or ALU 316, push data received from shared memory, or data that is stored in accumulate buffer 306 or accumulate buffer 308.

Multiplexer 320 allows selection of one of a plurality of polynomials (POLY1, POLY2) to be used for performing a multiply operation by multiplier 322. The polynomials are programmable and each processing path through a respective ALU 314, 316 may have a different programmable polynomial. For example, in one embodiment POLY1 may be the programmable polynomial associated with ALU 314 and POLY2 may be the programmable polynomial associated with ALU 316. Multiplexer 324 allows selection of one of a plurality of multiplier coefficients (M1, M2) to be used for performing a multiply operation by multiplier 322. For example, multiplier coefficient M1 may be associated with the processing path through ALU 314 and multiplier coefficient M2 may be associated with the processing path through ALU 316.

Multiplexers 328, 332 allows selection of either the result of the current operation output from the respective ALU 314, 316 or XOR 330 from multiplier 322. The result of one of the data processing paths (including ALU 314 or ALU 316) is either the final result to be returned to shared memory or an intermediate result to be stored in the respective accumulate buffer 306, 308.

The 64-bit XOR 330 and multiplexer 326 allows computations in the data processing path to include a multiply operation and an XOR operation to be performed in the data processing path. Based on the selection of outputs through the various multiplexers, each data processing path may include ALU operations (ALUs 314, 316), multiply operations (multiplier 322) and/or Exclusive Or (XOR) operations (XOR 330

The configuration registers 212 discussed in conjunction with FIG. 2 include a configuration register for each separate data processing path shown in FIG. 3.

FIG. 4 is a block diagram of an embodiment of a configuration register 400 for any one of the data processing paths in the data processing unit 218 shown in FIG. 3. In one embodiment the configuration register 400 has 32-bits that may be used to manage the data processing paths, that is, management of acceleration functions. In the embodiment shown, the configuration register 400 may include one or more reserved bits 402.

The configuration register 400 includes a preserve status field 404 which may include one bit indicating whether the status register contents are preserved or cleared after an operation. For example, the preserve status field 404 may be a single bit that may be set to logical '1' to preserve the status or cleared, that is, set to logical '0' to clear the contents of the status register prior to the next operation, so that the status may be updated by the next operation.

The source field 406 in the configuration register 400 may be configured to select the source of data for ALUs 314, 316 through multiplexers 310, 312. For example, the source of data for an operation to be performed in ALU 314 may be accumulate buffer 306 or accumulate buffer 308. In one embodiment, the source field 406 has one bit which is set or cleared to select the source of the ALU operand through multiplexers 310, 312.

The accumulate field 408 in the configuration register 400 selects whether the result for a data processing path through the data processing unit 218 is to be directed back to the respective accumulate buffer The calculation mode field 410 in the configuration register 400 allows each data processing path to be configured to perform different operations. The state of the calculation mode field 410 may be used to control the data path through multiplexers 328, 332 to the accumulate buffers 306, 308 and/or multiplexer 334. In one embodiment, the calculation mode field 410 has 3 bits allowing one of 8 operations to be selected. These operations are shown below in Table 1 with the associated calculation mode and the result:

TABLE 1

| Mode | Operation | Result |
|---|---|---|
| 000 | NULL | Data |
| 001 | Basic XOR, | Data XOR ACC |
| 010 | GF8 XOR, | Data GF8XOR ACC |
| 011 | Find M Byte | (Data == M)? 0x01: 0 |
| 100 | GF8 mul, | M · Data |
| 101 | mul data after XOR | M · (Data XOR ACC) |
| 110 | mul data before XOR | (M · Data) XOR Acc |
| 111 | mul Acc before XOR | (M · Acc) XOR Data |

XOR operations for modes 100, 101, 110 and 111 are performed by the 64-bit XOR 330. For example, for mode 100, multiplexer 326 selects 64'h0, and the data processing path performs a GF8 multiply operation in multiplier 322 with the result of the operation (M·Data) output from 64-bit XOR 330. The other modes listed in Table 1 will be described in greater detail later.

The configuration register 400 allows each data processing path to configure a different multiplier coefficient and Galois Field (GF) polynomial for performing a multiply operation in multiplier 322. The path through the multiplier 332 is shared by both data processing paths, that is, the path through ALU 314 and the path through ALU 316 Multiplexers 320, 324 allow the multiplier to be used for the current operation to be selected for one of the processing paths.

The multiplier coefficient field 412 allows one of a plurality of multiplier coefficients (M) to be configured. The multiplier coefficient (M1, M2) that is configured for the respective data processing path is input through multiplexer 324 for the respective data processing path that is using the multiplier 322 for the current operation. In one embodiment, the multiplier coefficient field has 8-bits.

The GF polynomial field 414 allows one of a plurality of polynomials to be configured for the data processing path. In one embodiment, the GF polynomial field has 8-bits. The GF polynomial (POLY1, POLY2) that is configured for the respective data processing path is input through multiplexer 320 for the respective data processing path that is currently using the multiplier 322 for the current operation. In one embodiment, the GF polynomial field 414 is set to '1D' (hexadecimal (hex)). However, the GF polynomial field 414 allows other GF polynomials to be configured.

The acceleration unit 208 may operate on any GF (2^8) polynomial field and is optimized to work in a power-efficient manner on the generator 1D (hex) that is commonly used. The acceleration unit 208 permits a fast implementation of multiplication with arbitrary coefficients by a single multiplier 322 that processes 8 bytes per cycle. Throughput is increased by performing multiplication on 8-bytes in parallel.

Special multiplexer paths discussed in conjunction with FIG. 3 and instructions enable the acceleration unit 208 to provide high performance on partial (random) writes by overlapping movement of data in and out of the acceleration unit 208 from/to shared memory 206 data movements.

The multiple paths also reduce wasteful multi-pass of data, that is, passing the same data from shared memory 206 to the data processing unit 218 to perform different operations.

The acceleration unit 208 provides high performance without the need to add significant additional logic. In one embodiment, the accumulate buffers 306, 308 are chosen to provide the minimum memory size. The single large multiplier 322 is used efficiently without significant loss of performance in storage applications. The acceleration unit 208 is also flexible in terms of supporting any 8-bit polynomial that generates an 8-bit field. Furthermore, each ALU 314, 316 may work independently on a different polynomial.

Figure 5:
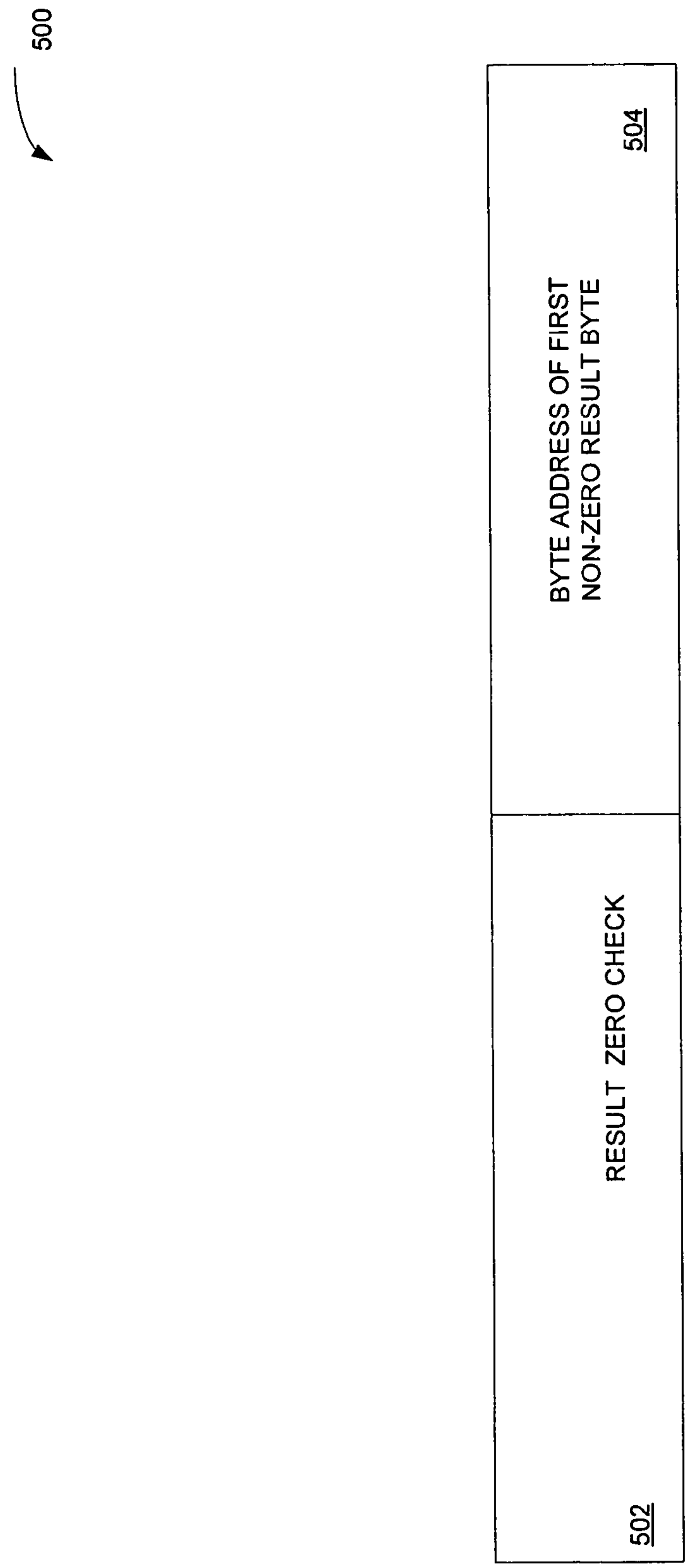
FIG. 5 is a block diagram of an embodiment of a status register for any one of the data processing paths in the data processing unit shown in FIG. 3.

FIG. 5 is a block diagram of an embodiment of a status register 500 for any one of the data processing paths in the data processing unit 218 shown in FIG. 3. Each data processing path through a respective ALU 314, 316 in the data processing unit 218 includes a respective status register 500. In the embodiment shown, the status register 500 includes a result zero check field 502 and a byte address field 504 for storing the byte address of the first non-zero result byte. The result zero check field 502 may be one bit field that is set or cleared dependent on the result of an operation. The byte address field 504 may have 9-bits for storing an address of a byte within a 512-byte data block.

In one embodiment, the acceleration unit 208 shown in FIG. 2 accelerates the computation of the P and Q syndromes for a RAID 6 stripe write operation. The P and Q syndromes are computed in parallel in the acceleration unit 208 on data blocks for the stripe that are stored in the shared memory 206. The data blocks for the stripe are received from shared memory 206 by the acceleration unit 208. One data processing path has its respective ALU 314, 316 configured to compute the P syndrome for the stripe and the other data processing path has it respective ALU configured to compute the Q syndrome for the same stripe.

As discussed previously, the P syndrome is computed by performing an XOR operation on the data blocks in the stripe to be stored across n data disk drives and is represented by equation 1 below:

$$P=D_0 \oplus D_1 \oplus D_2 \ldots D_{n-1} \quad \text{(Equation 1)}$$

Referring to FIG. 1, a stripe includes a group of equal sized data blocks 102, 104, 106 which may be referred to as strips. For each stripe there are two checksums, the P and Q syndromes 130, 132. The P and Q syndromes are computed across a data byte in the data blocks each stripe.

The full-stripe Q syndrome may be calculated using factorization. Each coefficient $g^i$ is an 8-bit polynomial. The general multiplication can also be performed efficiently using the acceleration unit 206 in a single pass with a 1 cycle throughput (8 Bytes). The Q syndrome is computed by multiplying (*) data blocks to be stored across n disk drives by a Galois Field (GF) polynomial (g) in multiplier 322 and performing an XOR operation in XOR 330 on the results of the multiplication operation as shown below in equation 2.

$$Q=g^0*D_0 \oplus g^1*D_1 \oplus g^2*D_2 \ldots \oplus g^{n-1}*D_{n-1} \quad \text{(Equation 2)}$$

In an embodiment of the invention, the P and Q syndromes are computed on the same data in parallel. With both computations performed in a single-pass of the data through the acceleration unit 208, data movement is optimized and system bus bandwidth (that is, to/from shared memory 206) is conserved. Thus, the acceleration unit 208 improves performance of the computation of the P and Q syndromes.

Figure 6:
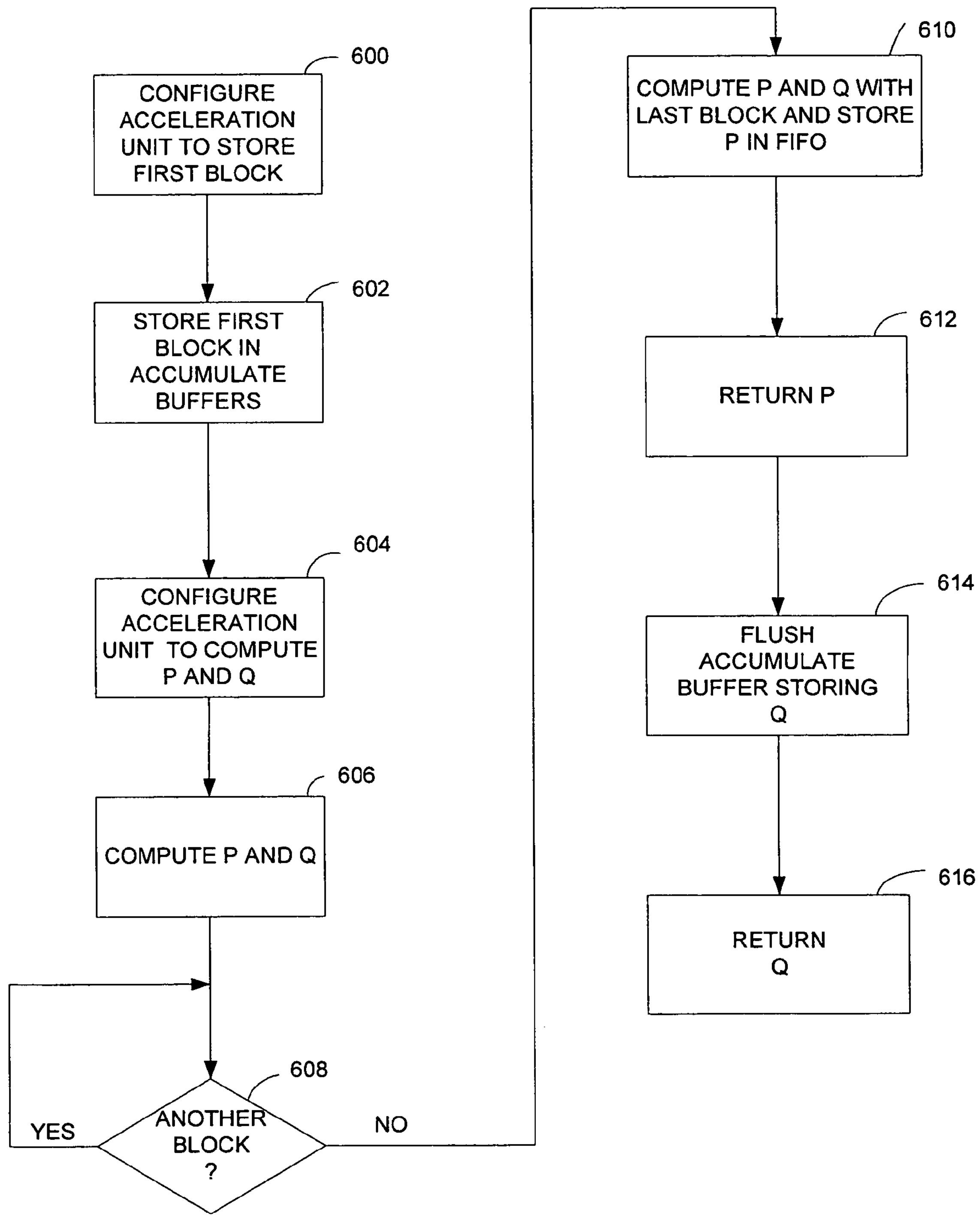
FIG. 6 illustrates an embodiment of a method for computing P and Q syndromes in parallel using the acceleration unit shown in FIG. 2 and the data processing unit shown in FIG. 3.

FIG. 6 illustrates an embodiment of a method for computing P and Q syndromes in parallel using the acceleration unit 208 shown in FIG. 2 and the data processing unit 218 shown in FIG. 3.

As previously discussed, the P and Q syndromes are computed for data blocks in a stripe across a plurality of hard disks. In one embodiment, each block of data (strip) in the stripe may store 512 bytes.

At block 600, each data processing path is configured by storing configuration data in the respective configuration register 400 in the acceleration unit 208. A first data processing path through ALU 314 may be configured to compute the P syndrome and a second data processing path through ALU 316 may be configured to compute the Q syndrome in parallel on the same data.

The respective acceleration unit configuration register 400 for each data processing path is initially configured to move data from shared memory 206 (FIG. 2) to the respective accumulate buffers 306, 308. The calculation mode field 410 is set to NULL, the accumulate field 408 is set to '1' to accumulate the push data in the accumulate buffer 306, 308 and the preserve status bit set to '1' to preserve the contents of the respective status register 500. All of the other fields in the respective configuration register 400 are set to the default values, with the GF polynomial field 414 set to the default value of 1D (hex), the multiplier co-efficient field 412 is set to the default value of '0 and the accumulate buffer source field 408 set to the respective accumulate buffer 306, 308 associated with the ALU 314, 316.

In one embodiment an instruction to load the acceleration unit configuration register 400 with a configuration register stored in shared memory 206 is executed by the accelerator state machine 216. Processing continues with block 602.

At block 602, each data processing path has been configured through the respective configuration registers 400 to store a block of data from shared memory 206 (FIG. 2) in the respective accumulate buffers 306, 308. A write instruction is issued to both data processing paths by the accelerator state machine 216 to move data from shared memory 206 and store it in the accumulate buffers 306, 308. The data stored in the accumulate buffers 306, 308 is the first data block for the first disk drive in a stripe. Based on the state of the configuration register 400, push data received from shared memory 206 enters ALUs 314, 316. No operation is performed in ALUs 314, 316 because the calculation mode field 410 in the configuration register 400 is NULL. The unmodified data flows out of the ALUs 314, 316 through multiplexers 328, 332 to return through multiplexers 302, 304 to be stored in the accumulate buffers 306, 308. Processing continues with block 604.

At block 604, after the first block of data for the stripe has been stored in the accumulate buffers 306, 308, the configuration registers 400 for the respective data processing paths are configured to perform P and Q syndrome computation. In one embodiment ALU 314 is configured to perform P syndrome computation on the stripe and ALU 316 is configured to perform Q syndrome operation on the stripe based on the state of the configuration registers.

ALU 314 is configured to compute the P syndrome with the calculation mode field 410 set to "XOR", the accumulate field 408 set to accumulate and the preserve status field 404 set to 'preserve' in the associated configuration register 400. All other fields in the configuration register 400 are set to the default values as discussed previously.

ALU 316 is configured to compute the Q syndrome with the calculation mode field 410 set to "mul data before XOR" the accumulate field 408 set to accumulate and the preserve status field 404 set to preserve status in the associated configuration register 400. Processing continues with block 606.

At block 606, each ALU 314, 316 performs the configured operation on two operands based on the state of the respective configuration register 400. The first operand is stored in the respective accumulate buffer 306, 308. The other operand is streamed from shared memory 206 through push data. The result of the operation performed by the respective ALU 314, 316 is stored in the respective accumulate buffer 306, 308.

For example, to compute the P syndrome, an XOR operation is performed in ALU 314 on data stored in accumulate buffer 306 received from the accumulate buffer 306 through multiplexer 310 and push data retrieved from shared memory 206. The data (operand) stored in the accumulate buffer 306 may be a first strip for the stripe from a first disk drive. The other data (operand) streamed from shared memory 206 may be the second strip for the stripe from a second disk drive. As the accumulate field 408 in the configuration register 400 is set to accumulate, the result of the operation in ALU 314 is stored back in the accumulate buffer 306 through multiplexers 328 and 302. Processing continues with block 608.

At block 608, if there is another strip (other than the last strip) in the stripe requiring further P or Q computation for the stripe to be performed, processing continues with block 606. If not, processing continues with block 610

At block 610, both the P and Q syndromes have been computed for all but the last strip in the stripe. The P syndrome and the Q syndrome are computed for the stripe with data from the last strip as one of the operands. The other operand is the result of the operation performed on the other strips that is stored in the accumulate buffers 306, 308. The result of the P syndrome computation is sent through multiplexers 328 and 334 to a "pull" First In First Out (FIFO) memory (not shown) that is shared by both data processing paths. The result of the Q operation is stored in accumulate buffer 308. Processing continues with block 612.

At block 612, the P syndrome computed for the stripe that is stored in the pull FIFO is moved to shared memory 206. Processing continues with block 614.

At block 614, the accumulate buffer 308 associated with the ALU 316 computing the Q syndrome is flushed to the pull FIFO. Processing continues with block 616.

At block 616, the Q syndrome stored in the pull FIFO is moved to shared memory 206. Both the Q syndrome and the P syndrome for the stripe have been computed in a single pass of the data received from shared memory 206 for the stripe. The results (P and Q) have been returned to shared memory 206.

Figure 7:
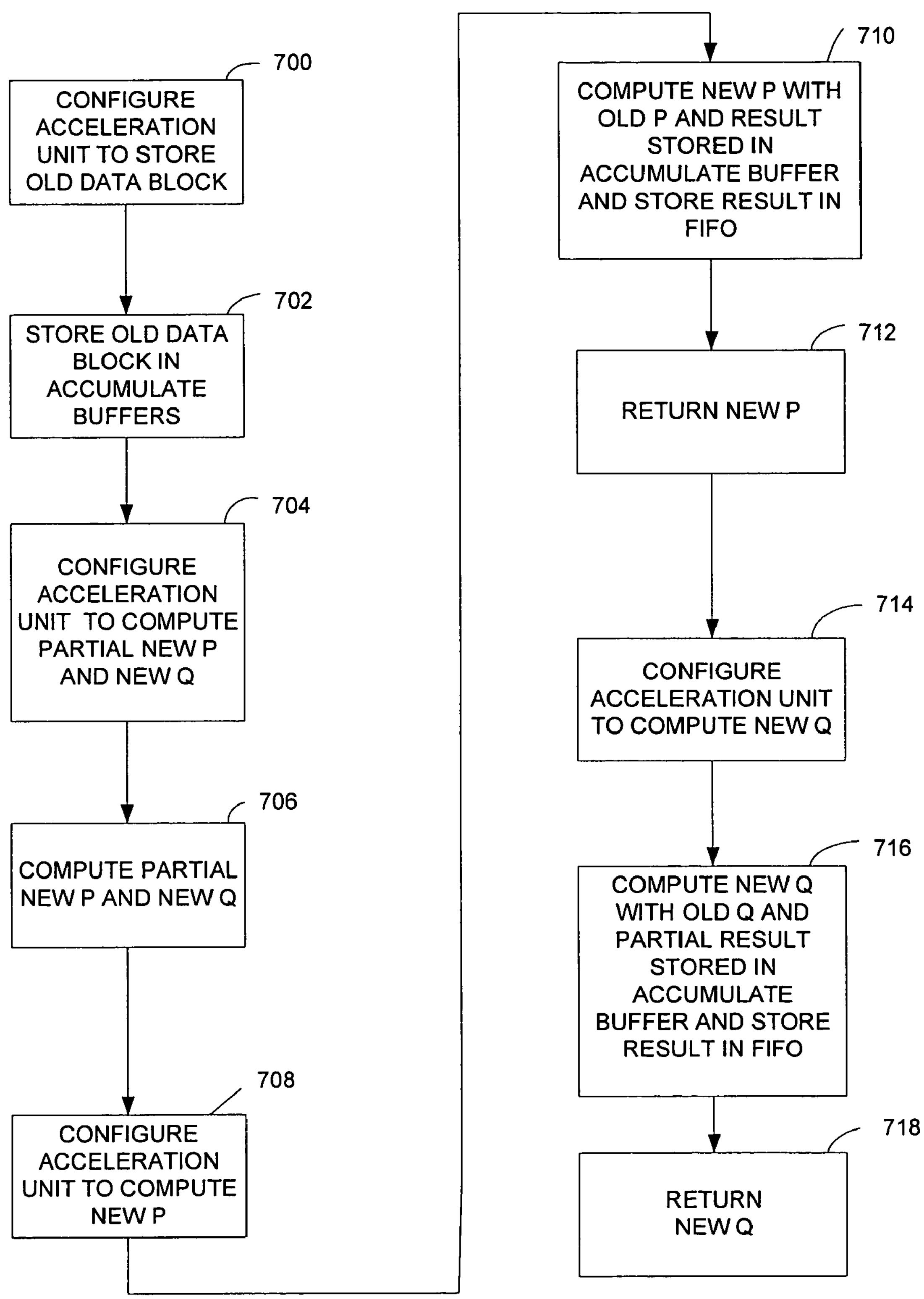
FIG. 7 illustrates an embodiment of a method for performing partial P and Q syndrome computation in the RAID-6 array shown in FIG. 1.

FIG. 7 illustrates an embodiment of a method for performing partial P and Q computation in the RAID-6 array 100 shown in FIG. 1. Partial P and Q computation is performed when data in a stripe has only changed on a single block of data (D) stored on one data disk for the stripe. The inputs are therefore the old values of P, Q and D for the stripe. The outputs are based on the old values of D, P and Q and the new values of D. The following equations define the operations for computing the new values for the P and Q syndromes.

$$Pnew=Pold\oplus(Dold\oplus Dnew) \quad \text{(Equation 3)}$$

$$Qnew=Qold\oplus M\cdot(Dold\oplus Dnew) \quad \text{(Equation 4)}$$

The (Dold⊕Dnew) expression is used in both equation 3 and equation 4 to compute the new P syndrome and the new Q syndrome. Thus, this expression may be computed once for Pnew and then used to compute Qnew. The acceleration unit 206 may be configured to perform this computation through the configuration registers 400.

At block 700, both data processing paths are configured to store old values of the data block D in the respective accumulate buffers 306, 308 by setting appropriate bits in the respective configuration registers 400. The calculation mode field 410 is set to NULL, the accumulate field 408 is set to '1' to store the result back in the accumulate buffers 306, 308 and the preserve status bit set to '1' to preserve the contents of the status register 214. All of the other fields in the configuration register 400 for each data processing path are set to the default values, with the GF polynomial field 414 set to the default value of 1D (hex), the multiplier co-efficient field 412 is set to the default value of '0 and the accumulator source field 408 set to the accumulate buffer 306, 308 associated with the respective ALU 314, 316. An instruction is executed by the state machine 216 to load a configuration register stored in shared memory 206 to initialize the fields in each configuration register 400. Processing continues with block 702.

At block 702, each data processing path has been configured through the respective configuration register 400 to store a block of data from shared memory 206 in the respective accumulate buffers 306, 308. A write instruction is issued to both data processing paths by the accelerator state machine 216 to move data from shared memory 206 and store it in the accumulate buffers 306, 308. The data stored in the accumulate buffers 306, 308 is the old data block. Based on the state of the configuration register 400, push data received from shared memory 206 enters ALUs 314, 316. No operation is performed in ALUs 314, 316 because the calculation mode field 410 in the configuration register 400 is NULL. The unmodified data flows out of the ALUS 314, 316 through multiplexers 328, 332 to return through multiplexers 302, 304 to be stored in the accumulate buffers 306, 308. Processing continues with block 704.

At block 704, the configuration register 400 for the respective data processing paths are reconfigured to compute a new P and Q syndrome for the new data block. In one embodiment, based on the state of each configuration register 400, ALU 314 is configured to compute the P syndrome and ALU 316 is configured to compute the Q syndrome.

ALU 314 is configured to compute a partial result for the new P syndrome with fields in the respective configuration register 400 set as follows: the calculation mode field 410 set to "XOR", the accumulate field 408 set to accumulate and the preserve status field 404 set to preserve. All other fields in the configuration register 400 are set to the default values as discussed previously.

ALU 316 is configured to compute a partial result for the new Q syndrome with fields in the respective configuration register 400 set as follows: the calculation mode field 410 set to "mul data after XOR", the accumulate field 408 set to accumulate, the preserve status field 404 set to preserve status and the multiplier co-efficient field 412 storing the multiplier co-efficient for the multiply operation to be performed by ALU 316. Processing continues with block 706.

At block 706, each ALU 314, 316 performs the configured operation based on the state of the respective configuration register 400 on two data inputs. The first data input (old data) is stored in the respective accumulate buffer 306, 308, the other data input (new data) is streamed into the ALUs 314, 316 from shared memory 206. The result of the operation performed by the respective ALU 314, 316 is stored in the respective accumulate buffer 306, 308. ALU 314 performs an XOR operation on old data stored in accumulate buffer 306 and new data streamed in through "push data". ALU 316 also performs an XOR operation on the old data stored in accumulate buffer 308 and new data streamed in through 'push data' from shared memory 206. The multiplier 322 multiplies the result of the XOR operation received through multiplexer 318 from ALU 316 by the multiplier co-efficient received from the output of multiplexer 324. After performing the configured operations, accumulate buffer 306 stores the result of (Dold⊕Dnew) and accumulate buffer 308 stores the result of M·(Dold⊕Dnew). Processing continues with block 708.

At block 708, the configuration register 400 associated with the computation of P is configured to compute the new P syndrome (Pnew) using the partial results stored in accumulate buffer 306. To compute Pnew, the fields in the configuration register 400 are configured as follows: the calculation mode field 410 set to XOR, the accumulate field 408 set to '1' to accumulate and the preserve status bit set to '1' to preserve the status.

The fields in configuration register 400 for the other data processing path that includes ALU 316 are configured as follows: the calculation mode field 410 set to NULL, the accumulate field 408 set to '0' to turn accumulate off, and the preserve status bit set to '1' to preserve the contents of the status register. Processing continues with block 710.

At block 710, the old P is streamed from shared memory 206 into ALUs 314, 316. The old P and the result of the prior operation stored in the accumulate buffers 306, 308 are input to ALUs 314, 316. The result of the operation in ALU 314, that is, Pold⊕(contents of accumulate buffer 306) is the new P (Pnew) which is forwarded through multiplexer 334 to the Pull FIFO and also sent back to accumulate buffer 306. As the NULL operation is performed in ALU 316 and the result returned to accumulate buffer 308, the data stored in accumulate buffer 308 is unchanged. Processing continues with block 712.

At block 712, the new P (Pnew) stored in the Pull FIFO is stored in shared memory 206. Processing continues with block 714.

At block 714, the configuration register 400 associated with the data processing path that includes ALU 316 is configured to compute the new Q (Qnew) using the partial results stored in accumulate buffer 308. The configuration register 400 associated with computing the P syndrome is configured as follows: the calculation mode field 410 set to NULL, the accumulate field 408 set to '0' to not accumulate, and the preserve status bit set to '1' to preserve the contents of the status register. The configuration register 400 associated with computing the Q syndrome is configured to compute the new Q syndrome with fields configured as follows: the calculation mode field 410 set to XOR, the accumulate field 408 set to '1' to accumulate and the preserve status bit set to '1' to preserve the status. Processing continues with block 716.

At block 716, the old Q is streamed through Push data from shared memory 206. The old Q and the result of the prior operation stored in the accumulate buffers 306, 308 are input to ALUs 314, 316. The result of the operation in ALU 316, that is Qold ⊕ (contents of accumulate buffer 308) is the new Q (Qnew) which is forwarded to the Pull FIFO and back to accumulate buffer 308. As the NULL operation is performed in ALU 314 and the result returned to accumulate buffer 306, the data stored in accumulate buffer 306 is unchanged. After block 714 executes, the data transfers in blocks 712 and 716 run concurrently. Thus, the new P is moved to shared memory 206 while the new Q is being computed. This reduces the time to output the result of the operation from the acceleration unit. Processing continues with block 718.

At block 718, the new Q (Qnew) stored in the Pull FIFO is read from the FIFO and stored in shared memory 206.

Figure 8:
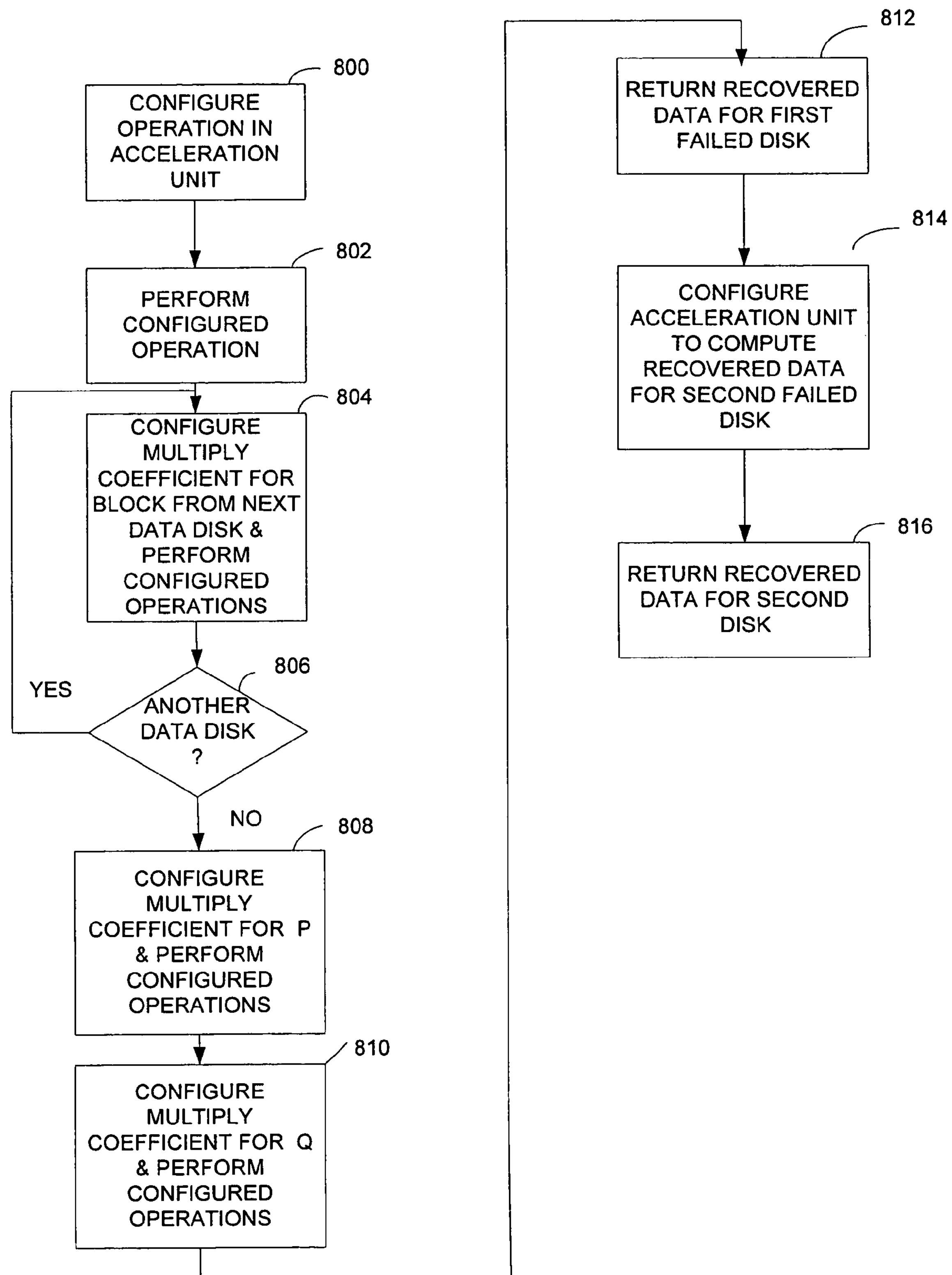
FIG. 8 illustrates an embodiment of a method for recovering from the loss of two data disks in the RAID-6 array shown in FIG. 1.

FIG. 8 is an embodiment of a method for recovering from the loss of two data disks in the RAID-6 array shown in FIG. 1. For example, if there are n data disks and data disks D0 and D1 have failed, data disks D0 and D1 may be recovered by performing the following computations on the remaining disks:

$$D0=a^2*D_2 \oplus a^3*D_3 \ldots \oplus a^n*D_n \oplus a*P \oplus a*Q \quad \text{(Equation 5)}$$

$$D1=b^2*D_2 \oplus {}^3*D_3 \ldots \oplus b^n*\mathrm{D}_n \oplus b*P \oplus b*Q \quad \text{(Equation 6)}$$

Typically, D0 is computed first. D1 may be computed using D0 as follows:

$$\mathrm{D1=D0} \oplus \mathrm{D}_2 \oplus \mathrm{D}_3 \ldots \oplus \mathrm{D}_n \oplus \mathrm{P} \quad \text{(Equation 7)}$$

However, this requires two passes of the data. As shown above, both D0 and D1 computation using equations 5 and 6 above require the use of a multiplier. As the probability that two disks will fail simultaneously is low, the additional cost of adding a second multiplier 322 to the acceleration unit 208 may not be justified for the small performance gain. Thus, to allow for recovery of two data disks with a single pass of the data, the single multiplier is shared by the two data processing paths. The multiplier may be shared via the selection of the polynomial (P) through multiplexer 320 and the multiplication coefficient (M) through multiplexer 324 for the particular data processing path that is using the multiplier 322.

Using the data processing unit 218 shown in FIG. 3, in an embodiment in which there are six data disks D0-D5 and D4 and D5 have failed, D4 and D5 may be recovered in a single pass of the data using D0-D3, P and Q.

D4 may be computed as a linear combination of the set {D0, D1, D2, D3, P, Q} with multiplier coefficients {m0, m1, m2, m3, mP, mQ}. In an embodiment, each data block in the set may have 512 bytes and each multiplier coefficient is one byte and is applied to the entire data block. Thus, the following operations are performed to recover D4 and D5:

$$D4=(m0*D_0 \oplus m1*D_1 \oplus m2*D_2 \oplus m3*D_3 \oplus mP*P) \oplus mQ*Q$$

$$D5=(D_0 \oplus D_1 \oplus D_2 \oplus D_3 \oplus P) \oplus D_4$$

At block 800, the ALUS 314, 316 for each data processing path are configured. The configuration register 400 associated with ALU 314 is configured as follows: the calculation mode field 410 is set to NULL and the accumulate field 408 is set to accumulate. The configuration register 400 associated with ALU 316 in the other data processing path is configured as follows: the calculation mode field 410 is set to GF8 MUL and the accumulate field 408 is set to accumulate the results of the GF8 MUL operation. Processing continues with block 802.

At block 802, each data processing path performs the configured operations on a block of data received from shared memory. The NULL operation in ALU 314 results in the received block of data being stored in accumulate buffer 306. The result of the GF8 multiply on the block of data is stored in accumulate buffer 308. Processing continues with block 804.

At block 804, the multiplier co-efficient (M) for the next data block is stored in the multiplier co-efficient field 412 in the configuration register 400 for ALU 316. The operation stored in both configuration registers 400 (XOR in ALU 314 and mul data before XOR in ALU 316) is performed on the result of the previous operation stored in the respective accumulate buffers 306, 308 and the new block streamed in from shared memory 206. Processing continues with block 806.

At block 806, if there is another data block to be streamed in, processing continues with block 804. If not, processing continues with block 808.

At block 808, accumulate buffers 306, 308 store the results of the following operations:

$$\text{Accumulate buffer 308}=(m0*D_0 \oplus m1*D_1 \oplus m2*D_2 \oplus m3*D_3)$$

$$\text{Accumulate buffer 306}=(D_0 \oplus D_1 \oplus D_2 \gamma D_3)$$

The configuration register 400 associated with the data processing path that includes ALU 314 is configured with the multiplier coefficient for P. The P block is streamed into both ALUs 314, 316. The accumulate buffers 306, 308 store the results of the following operations:

$$\text{Accumulate buffer 308}=(m0*D_0 \oplus m1*D_1 \oplus m2*D_2 \oplus m3*D_3 \oplus mP*P)$$

$$\text{Accumulate buffer 306}=(D_0 \oplus D_1 \oplus D_2 \oplus D_3 \oplus P)$$

At block 810, the configuration register 400 associated with the data processing path that includes ALU 316 is configured with the multiplier coefficient for Q; the configuration register 400 associated with the data processing path that includes ALU 314 is configured to not accumulate the results of this operation. The Q data is streamed into both ALUS 314, 316. The result of the operation in ALU 316, that is mQ*Q⊕ (contents of accumulate buffer 308) is the recovered D4 which is forwarded to the Pull FIFO and back to accumulate buffer 308. After the operation configured in each ALU has been performed on the Q block, the accumulate buffers 306, 308 store the result of the following operations.

Accumulate buffer 308=$D4=((m0*D_0 \oplus m1*D_1 \oplus m2*D_2 \oplus m3*D_3 \oplus mP*P) \oplus mQ*Q)$ Accumulate buffer 306=$(D_0 \oplus D_1 \oplus D_2 \oplus D_3 \oplus P)$ Processing continues with block 812.

At block 812, the recovered data for D4 is stored back to shared memory 206.

Processing continues with block 814.

At block 814, the configuration register 400 associated with the data processing path that includes ALU 314 is configured to XOR and accumulate; the configuration register 400 associated with the data processing path that includes ALU 316 is configured to disable the results from that path from being returned to the accumulate buffer. The D4 data is streamed into both ALUS 314, 316. The result of the operation in ALU 314, that is D4⊕(contents of accumulate buffer 306), is the recovered D5 which is forwarded to the Pull FIFO and back to accumulate buffer 306. That is, the following operation is performed:

$$D5=(D_0 \oplus D_1 \oplus D_2 \oplus D_3 \oplus P) \oplus D_4$$

The result is stored in accumulate buffer 306.

At block 816, the recovered data for data disk D5 is returned to shared memory.

In addition to the methods for performing recovery from a double disk failure, partial P and Q update and computation of P and Q syndrome described in conjunction with FIGS. 6-8, the acceleration unit may also be used to accelerate the recovery from a data disk and P disk double failure or a data disk and Q disk double failure by configuring the configuration registers to perform the recovery operation. In the case of a failure of both the P and Q disks, the P and Q disks may be recovered using the method described in conjunction with FIG. 7.

The acceleration unit may be used to accelerate data processing operations other than those involving recovery of P, Q and data disks and computation of P and Q syndromes for a RAID-6 system.

Figure 9:
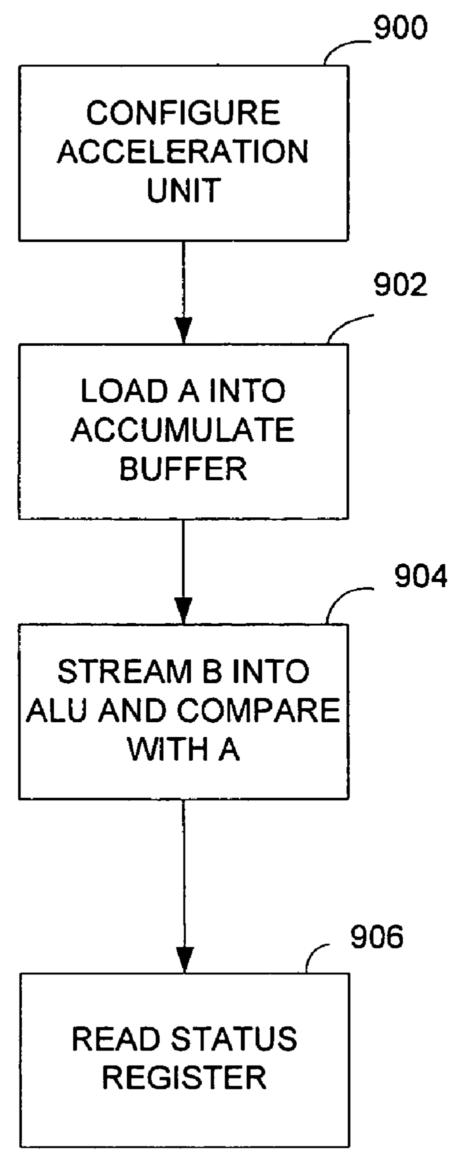
FIG. 9 illustrates an embodiment of a method for performing a compare check that may be performed in the acceleration unit shown in FIG. 2.

FIG. 9 illustrates an embodiment of a method for performing a compare check that may be performed in the acceleration unit shown in FIG. 2. The compare function compares two data blocks (A and B) and checks that data block A is equal to data block B. FIG. 9 will be described in conjunction with FIGS. 2 and 3.

At block 900, the configuration register 400 for ALU 314 is configured to perform the compare operation. The calculation mode field 410 of the configuration register 400 for ALU 314 is set to XOR and the accumulate field 408 is configured to accumulate the results. The calculation mode field 410 of the configuration register 400 for ALU 316 is set to NULL with no accumulate of the results. Processing continues with block 902.

At block 902, data from a first data block (the 'A data') is loaded into accumulate buffer 306. Processing continues with block 904.

At block 904, data from a second data block (the 'B data') is streamed into the acceleration unit 208 from the shared memory 206 and an XOR operation is performed on a byte-by-byte basis with the A data stored in the accumulate buffer 306. Processing continues with block 906.

At block 906, after the B data has been streamed through ALU 314, the status register 500 associated with ALU 314 is read. The state of the result zero check field 502 in the status register 500 associated with ALU 314 indicates whether a miscompare was detected. Also, the byte address of the first miscompare byte in the data block may be stored in the byte address field 504 in the status register 500.

Figure 10:
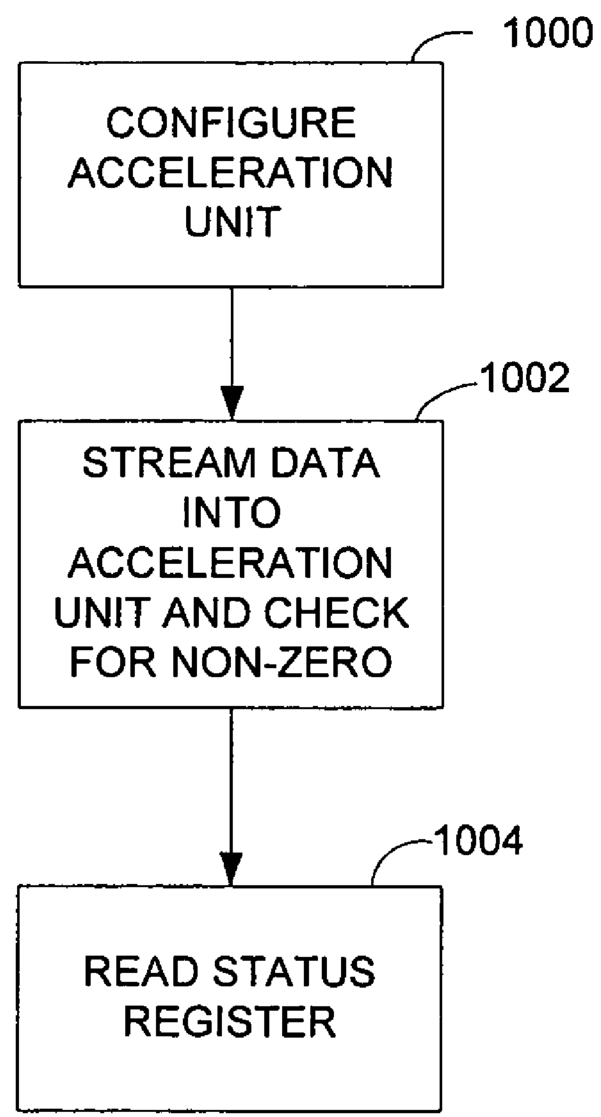
FIG. 10 illustrates an embodiment of a method for performing a result non-zero check that may be performed in the acceleration unit shown in FIG. 2.

FIG. 10 is an embodiment of a method for performing a result non-zero check that may be performed in the acceleration unit 208 shown in FIG. 2.

At block 1000, the configuration register 400 for ALU 314 is configured to perform the result non-zero check operation. The calculation mode field 410 of the configuration register 400 for ALU 314 is set to NULL, the preserve status field 404 is set to update status, and the accumulate field 408 is configured not to accumulate the results. The calculation mode field 410 of the configuration register 400 for ALU 316 is also set to NULL with no accumulate of the results. Processing continues with block 1002.

At block 1002, data from a data block is streamed into both ALUS 314, 316 from the shared memory and a NULL operation is performed on a byte-by-byte basis with no data stored in the accumulate buffer 306.

At block 1004, after the data has been streamed through the ALUs 314, 316, the status register 500 associated with ALU 314 is read. The state of the result zero check field 502 in the status register 500 associated with ALU 314 indicates whether a result non-zero was detected. Also, the byte address of the first non-zero result byte in the block may be stored in the byte address field 504 in the status register 500.

In another embodiment, the ALU in one data processing path may be configured to perform a result non-zero check and the ALU in the other data processing path configured to perform a compare check. The two operations may be performed in parallel on the same block of data.

Enhanced Byte-search functions are useful in Public Key Cryptography Systems (PKCS) and Random Number Generators (RNG), for example, to search for Zero bytes or to find a variable pattern at the start of a message of the form 0*0x01*. In the latter case, the position of the variable pattern indicates the start of a well-formed message body. The search for the start of the well formed message body is very slow and requires a large amount of code space when performed in the micro engine 204.

Figure 11:
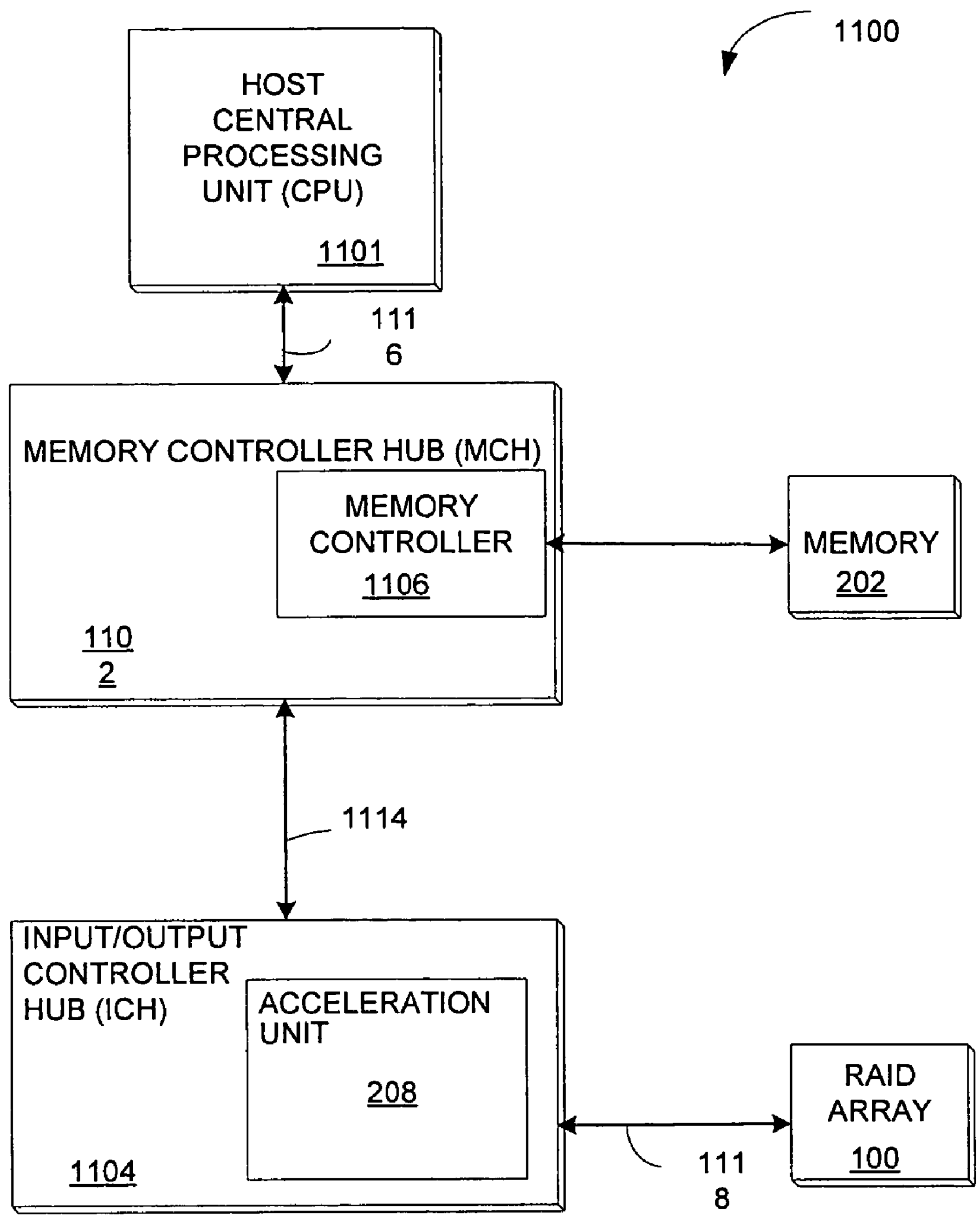
FIG. 11 is a block diagram of a system that includes an embodiment of an acceleration unit to accelerate RAID-6 computations according to the principles of the present invention.

FIG. 11 is a block diagram of a system that includes an embodiment of an acceleration unit to accelerate RAID-6 computations according to the principles of the present invention.

The system 1100 includes a host Central Processing Unit (CPU) 1101, a Memory Controller Hub (MCH) 1102 and an I/O Controller Hub (ICH) 1104. The MCH 1102 includes a memory controller 1106 that controls communication between the CPU 1101 and memory 202. The CPU 1101 and MCH 1102 communicate over a system bus 1116.

The Host Central Processing Unit (CPU) 1101 may be any one of a plurality of processors such as a single core Intel® Pentium IV® processor, a single core Intel Celeron processor, an ®XScale processor or a multi-core processor such as Intel® Pentium D, Intel® Xeon® processor, or Intel® Core® Duo processor or any other type of processor.

The memory 202 may be Dynamic Random Access Memory (DRAM), Static Random Access Memory (SRAM), Synchronized Dynamic Random Access Memory (SDRAM), Double Data Rate 2 (DDR2) RAM or Rambus Dynamic Random Access Memory (RDRAM) or any other type of memory.

The ICH 1104 may be coupled to the MCH 1102 using a high speed chip-to-chip interconnect 1114 such as Direct Media Interface (DMI). DMI supports 2 Gigabit/second concurrent transfer rates via two unidirectional lanes.

The ICH 1104 may include an acceleration unit 208 for accelerating RAID computations for a RAID array 100 coupled to the ICH 1104. The ICH 1104 may communicate with the RAID array 100 over a storage protocol interconnect 1118 using a serial storage protocol. Commands, data and status information encapsulated in frames may be exchanged between the ICH 1104 and the RAID array 100, over the storage protocol interconnect 1118 using standard serial attached storage protocol suites.

There are many serial storage protocol suites such as, Serial Attached Small Computer System Interface (SAS) and Serial Advanced Technology Attachment (SATA). A version of the SATA protocol is described in "Serial ATA: High Speed Serialized AT Attachment," Revision 1.0a, published on Jan. 7, 2003 by the Serial ATA Working Group. A version of the SAS protocol is described in "Information Technology—Serial Attached SCSI—1.1," Working Draft American National Standard of International Committee For Information Technology Standards (INCITS) T10 Technical Committee, Project T10/1562-D, Revision 1, published Sep. 18, 2003, by American National Standards Institute (ANSI). A version of the Fibre Channel (FC) protocol is described in the American National Standards Institute (ANSI) Standard Fibre Channel Physical and Signaling Interface-2 (FC-FS-2) Aug. 9, 2005 Specification.

It will be apparent to those of ordinary skill in the art that methods involved in embodiments of the present invention may be embodied in a computer program product that includes a computer usable medium. For example, such a computer usable medium may consist of a read only memory device, such as a Compact Disk Read Only Memory (CD ROM) disk or conventional ROM devices, or a computer diskette, having a computer readable program code stored thereon.

While embodiments of the invention have been particularly shown and described with references to embodiments thereof, it will be understood by those skilled in the art that various changes in form and details may be made therein without departing from the scope of embodiments of the invention encompassed by the appended claims.

The invention claimed is:

1. An apparatus comprising:

a first data processing path to receive a block of data, the first data processing path including a first accumulate buffer to store the block of data and a first arithmetic logical unit to perform a first operation on the block of data; and a second data processing path to receive the block of data, the second data processing path including a second accumulate buffer to store the block of data and a second arithmetic logical unit to perform a second operation on the block of data, the first data processing path and the second data processing path sharing a multiplier, the multiplier to perform a multiply operation on the block of data, each of the data processing paths to process the block of data in parallel to provide a first result block of data and a second result block of data in a single pass of the block of data through the data processing paths, the first arithmetic logical unit has a first programmable polynomial and the second arithmetic logical unit has a second programmable polynomial.

2. The apparatus of claim 1, wherein the block of data is a data block in a Redundant Array of Independent Disks (RAID) stripe.

3. The apparatus of claim 2, wherein the first operation to compute a P syndrome for the stripe and the second operation to compute a Q syndrome for the stripe.

4. The apparatus of claim 2, wherein the RAID stripe includes a P syndrome block and a Q syndrome block, the first operation to recover a first data block and the second operation to recover a second block in the RAID stripe using the P syndrome block, the Q syndrome block and other data blocks in the RAID stripe.

5. The apparatus of claim 2, wherein the RAID stripe is updated for a new data block, the first operation to compute a new P syndrome for the stripe using an old P syndrome block, an old data block and a new data block for the stripe.

6. The apparatus of claim 5, wherein the second operation to compute a new Q syndrome using an old Q syndrome block, the old data block and the new data block for the stripe.

7. The apparatus of claim 6, wherein the new P syndrome is moved to a shared memory while the new Q syndrome is computed.

8. The apparatus of claim 1, wherein the first operation to perform a pattern match on the block of data stored in the first accumulate buffer and a second block of data received by the first data processing path.

9. The apparatus of claim 1, wherein the first operation to perform a non zero result operation on the received block of data.

10. The apparatus of claim 1, wherein the first operation to perform on the first block of data and a second block, the first block of data and the second block included in a Redundant Array of Independent Disks (RAID) level 6 stripe, the result to be stored in the first accumulate buffer for a subsequent operation with another block.

11. A method comprising:

storing a block of data in a first accumulate buffer in a first data processing path;

storing the block of data in a second accumulate buffer in a second processing path, the first processing path and the second processing path sharing a multiplier;

performing, by a first arithmetic logical unit a first operation on the block of data; and performing, by a second arithmetic logical unit a second operation on the block of data, the first data processing path and the second data processing path processing the block of data in parallel to provide a first result block of data and a second result block of data in a single pass of the block of data through the data processing paths the first arithmetic logical unit has a first programmable polynomial and the second arithmetic logical unit has a second programmable polynomial.

12. The method of claim 11, wherein the block of data is a data block in a Redundant Array of Independent Disks (RAID) stripe.

13. The method of claim 12, wherein the first operation computes a P syndrome for the stripe and the second operation computes a Q syndrome for the stripe.

14. The method of claim 12, wherein the RAID stripe includes a P syndrome block and a Q syndrome block, the first operation to recover a first data block and the second operation to recover a second block in the RAID stripe using the P syndrome block, the Q syndrome block and other data blocks in the RAID stripe.

15. The method of claim 12, wherein the RAID stripe is updated for a new data block, the first operation computing a new P syndrome for the stripe using an old P syndrome block, an old data block and a new data block for the stripe.

16. The method of claim 15, wherein the second operation computes a new Q syndrome using the old Q syndrome block, the old data block and the new data block for the stripe.

17. The method of claim 16, wherein the new P syndrome is moved to a shared memory while the new Q syndrome is computed.

18. The method of claim 11, wherein the first operation to perform a pattern match on the block of data stored in the first accumulate buffer and a second block of data received by the first data processing path.

19. The method of claim 11, wherein the first operation to perform a non zero result operation on the received block of data.

20. The method of claim 11, wherein the first operation to perform on the first block of data and a second block, the first block of data and the second block included in a Redundant Array of Independent Disks (RAID) level 6 stripe, the result to be stored in the first accumulate buffer for a subsequent operation with another block.

21. An article including a machine-accessible storage medium having associated information, wherein the information, when accessed, results in a machine performing:

storing a block of data in a first accumulate buffer in a first data processing path;

storing the block of data in a second accumulate buffer in a second processing path, the first processing path and the second processing path sharing a multiplier;

performing, by a first arithmetic logical unit a first operation on the block of data; and performing, by a second arithmetic logical unit a second operation on the block of data, the first data processing path and the second data processing path processing the block of data in parallel to provide a first result block of data and a second result block of data in a single pass of the block of data through the data processing paths, the first arithmetic logical unit has a first programmable polynomial and the second arithmetic logical unit has a second programmable polynomial.

22. The article of claim 21, wherein the block of data is a data block in a Redundant Array of Independent Disks (RAID) stripe.

23. A system comprising:

a redundant array of independent disks (RAID) system having a plurality of Serial Attached Small Computer System Interface (SAS) disk drives; and an acceleration unit to process data for the RAID system, the acceleration unit comprising:

a first data processing path to receive a block of data, the first data processing path including a first accumulate buffer to store the block of data and a first arithmetic logical unit to perform a first operation on the block of data; and a second data processing path to receive the block of data, the second data processing path including a second accumulate buffer to store the block of data and a second arithmetic logical unit to perform a second operation on the block of data, the first data processing path and the second data processing path sharing a multiplier, the multiplier to perform a multiply operation on the block of data, each of the data processing paths to process the block of data in parallel to provide a first result block of data and a second result block of data in a single pass of the block of data through the data processing paths.

24. The system of claim 23, wherein the block of data is a data block in a Redundant Array of Independent Disks (RAID) stripe.

* * * * *

UNITED STATES PATENT AND TRADEMARK OFFICE

CERTIFICATE OF CORRECTION

PATENT NO. : 7,664,915 B2
APPLICATION NO. : 11/642315
DATED : February 16, 2010
INVENTOR(S) : Gopal et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 486 days.

Signed and Sealed this

Twenty-eighth Day of December, 2010

David J. Kappos

*Director of the United States Patent and Trademark Office*